June 29, 1926.
E. TAYLOR
1,590,600
TREATING SILK AND CELLULOSE MATERIAL
Filed June 17, 1924
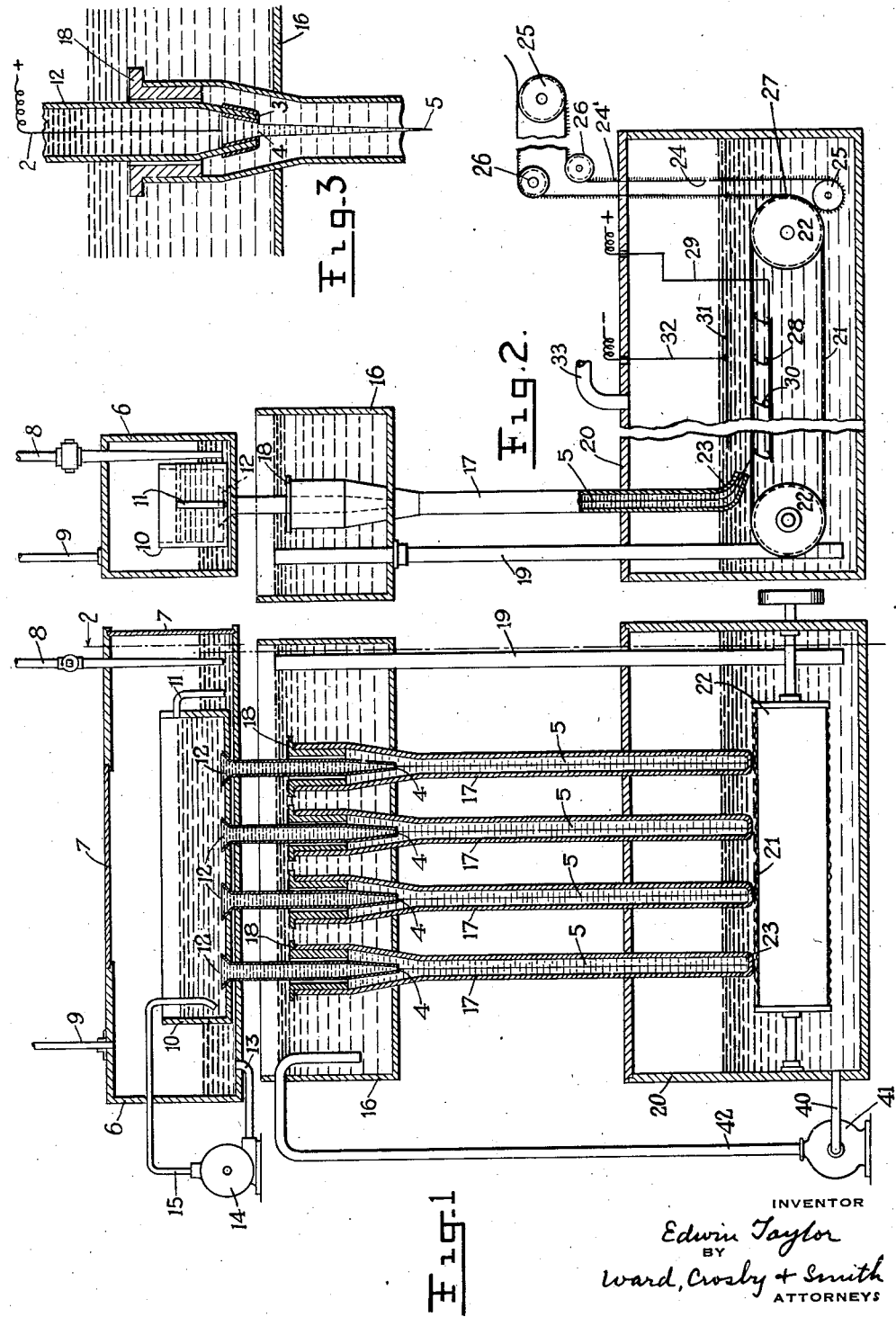
INVENTOR
Edwin Taylor
BY
Ward, Crosby + Smith
ATTORNEYS Patented June 29, 1926.

1,590,600

UNITED STATES PATENT OFFICE.

EDWIN TAYLOR, OF BROOKLYN, NEW YORK, ASSIGNOR TO TAYLOR LABORATORIES, INC., OF NEW YORK, N. Y., A CORPORATION OF NEW YORK.

TREATING SILK AND CELLULOSE MATERIAL.

Application filed June 17, 1924. Serial No. 720,521.

My invention relates to improvements in treating silk and cellulose material, and more particularly as applied to the treatment and separation of silk and cotton elements from mixtures of silk and cotton. There is much material comprising mixtures of silk and cotton (with or without other materials admixed therewith) such as various used fabrics, which ordinarily goes to waste, and the main object of the invention is to provide a simple and efficient method by means of which one or both of these elements may be recovered in useful form. The invention may also be applied to the separation of other dissimilar organic materials.

In utilizing my invention for the separation of silk and cotton from silk and cotton mixtures, I preferably proceed as follows: The mixture of silk and cotton if in the form of pieces of fabric, is preferably first cut up and then put in a nickel-ammonia solution, which may be made for example by dissolving nickel oxide in strong ammonia water. The silk content of the mixture will dissolve in the nickel-ammonia solution, while the cotton or cellulose content will remain undissolved. The undissolved cotton or cellulose is then separated from the dissolved silk by filtration. The cotton or cellulose may then be dissolved in a cupro-ammonia solution, made for example by dissolving cupric oxide in strong ammonia water. These two solutions may then be treated and subjected to electrolytic action to remove the solvent constituents and produce silk and cellulose in useful form in any suitable manner, for example as disclosed in my copending application Serial No. 364,980 filed Mar. 11, 1920. If it is desired to make filaments or threads an apparatus may be employed such as is illustrated in the accompanying drawings forming a part of this specification in which—

Fig. 1 is a vertical section through the apparatus;

Fig. 2 is a vertical section taken at right angles to Fig. 1; and

Fig. 3 is a detail vertical section illustrating a modification.

Referring to the drawings, 6 is a closed tank provided with plates of glass 7. 8 is a pipe for filling under pressure, and 9 is a pipe for the ammonia. Inside of tank 6 is a second tank 10 fitted with an outlet 11 reaching nearly to the bottom of tank 6. 12 is a series of outlet nozzles of uniform dimensions provided with outlet orifices 4 of exact size and preferably made of glass extending through the bottom of both tanks. At the lower part of tank 6 is an outlet pipe 13, connecting with a circulating pump 14, which in turn connects with pipe 15 extending through the wall of 6 and nearly to the bottom of tank 10. Below is another tank 16, provided with downwardly extending draft-tubes 17 of larger diameter at their upper extremities and of somewhat funnel-shaped contour. The nozzles 12 extend into the draft-tubes 17, to a point somewhat above the commencement of smallest diameter of 17. The nozzles 12 are centered and held spaced in the upper ends of tubes 17 by a series of separators 18, which also serve to prevent swirling of the flow of liquids passing between the nozzles and the tubes. Tank 16 is provided with an outlet tube 19 extending downward from a point above the level of the tubes 17, and the spacing partitions 18 nearly to the bottom of another closed tank 20. Tank 20 is provided near the bottom with an outlet pipe 40, connecting with a circulating pump 41, which is provided with a delivery pipe 42, extending to a point near the bottom of tank 16. Slightly above the bottom of tank 20 is an endless metallic screen or belt 21, driven at a constant speed upon the drum or roller 22. The draft tubes 17, extending downwardly from tank 16 are preferably provided at their lower extremities with curved ends 23, so disposed that material issuing from them will be deposited on or slightly above the belt in a direction parallel to the belt movement. Near the farther end of tank 20 and approximately at right angles with belt 21 is a second endless belt 24 made of suitable fabric and provided on its outer surface with short rather stiff bristles 24'. This belt drives at the same speed as belt 21. It is driven by means of rollers 25 over guide rolls 26 and contacts with belt 21, at some determined point say 27, its object being to brush off and lift any material adhering to belt 21. Below the upper surface of belt 21 is a metallic bar or plate 28, provided with an electrical connection 29, and a series of contact strips or shoes 30 brushing against the underside of the belt 21 and causing it to become an anode during operation. Above the belt 21 and separated from it by an appreciable distance is a metallic plate 31 substantially the width of the belt, provided with an electrical connection 32. Plate 31, during operation becomes the cathode of an electrical circuit and may be of zinc, copper, nickel, etc., to favor the deposition of the metallic solvent constituent employed. A pipe 33 is provided through the top of tank 20 by which the gaseous constituents may be removed by suction.

The operation is as follows: Tank 6 is partially filled with the cotton (cellulose) solution the circulating pump 14 is started and a constant and predetermined pressure placed upon the tank contents through pipe 9, cellulose solution may be added from time to time and in the case of ammonia solutions, I prefer to use ammonia gas to produce this pressure. When using other solutions an inert gas such as nitrogen is preferable. Tank 10 and the nozzles 12 are filled by the action of the pump until the liquid overflows through pipe 11 back to tank 6. The delivery of the pump 14 is at all times greater than the delivery of solution through the orifice 4 of the nozzles 12, the result being a constant head and a constant and exact delivery of cellulose solution through the orifices of the nozzles.

Tank 20 is filled with a very dilute solution of sulphuric, nitric, or acetic acid. I have found in practice that from ¼ to ⅝ of 1 per cent acid is sufficient. Tank 16 is also filled with this solution by means of pump 41 and its connections. This pump also is of such size that its delivery at all times is greater than the combined deliveries of the tubes 17, the acid solution rising above the tubes until it reaches the level of the overflow pipe 19 by which the excess liquid pumped is returned to tank 20. The upper level of pipe 19 is far enough above the openings of the tubes 17 to prevent the downrushing liquid from drawing air, etc., with it from the surface and so breaking the continuity of the column. The separators 18 also add to this continuity by preventing swirling and insuring a parallel uniform, smooth flow, the object being to obtain a series of columns of liquid flowing downwardly at a constant and uniform speed. As these steadily flowing columns pass the orifices 4 of the nozzles 12 they envelop the streams or threads of cellulose issuing therefrom at a purposely slower speed, and by the friction in passing, tend to accelerate the cellulose to an equal speed. This acceleration puts the viscous cellulose under tension and causes it to elongate or stretch with a consequent diminution in diameter. The amount of this stretch and the consequent diameter of the filament, is a resultant of several factors. The size of the nozzle orifice, the temperature and viscosity of the cellulose solution and the pressure upon it, the length or "head" and consequent speed of the descending column of dilute acid and the strength of the acid, have each a bearing on the size and character of the issuing threads 5, any variation in any one, causing a corresponding variation in the finished filament. Any well known means may be employed for keeping the various solutions at an approximately constant temperature.

If the acid solution used is just strong enough to prevent dilution of the cellulose or other organic material by the water present, it is evident that the threads or filaments 5 during their passage through tubes 17 will remain in a gelatinous or viscous condition still tending to elongate under the tension caused by the downflowing acid. If on the other hand this solution be increased in acidity, a coating of cellulose hydrate will be formed almost immediately, covering the threads with an almost rubberlike tube and limiting the drawing or stretching to a point comparatively close to the orifices of nozzles 12, thereby resulting in a thicker filament. Almost the same result may be obtained by increasing the pressure in tank 6, thereby increasing the flow of cellulose and decreasing the pull or tension of the descending acid by the nearer approximation in speed of the cellulose threads and the acid column but in this case by using the most dilute acids, preventing the formation of any appreciable covering of cellulose hydrate.

The filaments 5, together with the acid water now pass through the curved extremities 23 of the tubes 17, the filaments being carried forward and held in a direction parallel to one another and to the movement of the belt 21, by the rush of the outgoing acid liquor. At this point the filaments pass into an electrical field between the belt, which is an anode, and the metal cathode 31, the cellulose threads being drawn to the belt and remaining in contact with it during their passage through tank 20, the copper or other metal being deposited on the cathode, and the volatile constituent released at the same time by the current. The directional flow of the liquid emerging from apertures 23, is important as by its means, if breakage of a filament should occur during forming or descent through the draft tube, the end behind the break as it emerges from apertures 23 is held in the electric field and parallel to the belt until it adheres to the same, and in position to be picked up by belt 24. After passage through the electric field, which may be as long as required depending upon the length of tank 20, belt 21, etc., the threads or filaments 5, now deprived of solvent constituents and consisting of practically pure cellulose with a glass-like appearance and lustre are brushed from belt 21, on to belt 24, and are carried upon the bristly surface of this belt to the washing operations, being finally lifted from it on to reels, etc., in a condition permitting of further treatment or use.

Slight modifications in results may be obtained by keeping the cellulose constantly in an electric field even during forming and stretching, in which case I employ a modified nozzle shown in Fig. 3, in which 12 is the nozzle, inserted in the draft tube 17, and centered as before by the separators 18. The end of the nozzle is provided with a coating or cap 3 of platinum, through which is formed the orifice 4, of any desired dimension. The platinum cap 3, is connected by a suitable wire 2, to the positive side of an electrical circuit and becomes an anode, the current traversing the thread and the descending acid water to a cathode similar to 31, Fig. 2. The belt arrangement is similar to that in Fig. 2, a separate current being passed from belt 21 to electrode 31, or the same source of current may be employed by placing resistance in the belt circuit equal to the resistance of the column of liquid between electrode 3 and cathode 31. Electrode 3 may be placed in the organic solution itself but the arrangement is apt to block orifice 4, on account of the dropping of particles of cellulose, etc., which may have deposited upon it and for this reason the platinum cap 3 is preferred. By this electrode arrangement the cellulose thread or filament lies in an electrical circuit from the time of forming or drawing, to the time of complete solvent removal.

By my method a minimum amount of acid is required to prevent cellulose solution or dilution, the purest form of cellulose obtained as a finished product and the filaments drawn to a fineness readily adapting them for use as "artificial silk," etc.

By nitrating these finished filaments and afterwards denitrating them by means of alkaline sulphydrates, cuprus chloride, etc., products are obtained comparable with the best of the commercial "artificial silks."

The solution of this silk in the nickel ammonia solution may then be treated in substantially the same way in the same or a similar apparatus to form silk threads or filaments. Likewise the separate cellulose and silk solutions may be treated in any of the ways described in copending applications Serial No. 314,102, filed July 29, 1919; Serial No. 341,953, filed December 2, 1919, and Serial No. 364,980, filed March 11, 1920, to make various useful products.

My method forms a cheap and convenient means for recovering or increasing the commercial value of silk cuttings, worn silk or silk waste. It is of great value in decolorizing and increasing the valuation of the so-called "wild silk," no satisfactory commercial process having yet been developed to accomplish this by bleaching the fiber as it comes from the cocoon. I prefer to dissolve the silk in a solution of hydrated nickel-oxide in concentrated ammonia water and to employ a nickel cathode 31, otherwise the apparatus and methods are the same as with cellulose.

The methods of stretching the threads by the friction of the descending acid water and the even tension secured thereby is far cheaper, more uniform and much less complicated and annoying, than the mechanical methods now employed for producing and regulating this tension.

In treating silk and cotton mixtures, if a resulting product containing both silk and cotton is desired, or is not objectionable, the silk and cotton mixture may be dissolved in the cupro-ammonia solution which will dissolve both the silk and cotton, and then the solution may be treated electrolytically in any of the ways above referred to.

As to the process in general, the utmost care should be exercised to avoid all dust and dirt. The solutions must be carefully filtered and dirt kept out afterward. All the apparatus should be closed in wherever possible. The water employed for making up the solutions should be distilled or at any rate contain a minimum of mineral salts and should be free from carbonic acid gas if a fine filament or a perfectly transparent product is desired. In working with the ammonia solutions, carbonic acid is very objectionable on account of the formation of ammonium carbonate and its subsequent splitting up into its gaseous constituents during electrolysis, the $CO_2$ released being practically insoluble and clouding the film or filament by the formation of minute bubbles.

Air or other gas bubbles in the organic solutions must also be avoided and for this reason all pipes for filling and circulating should dip well below the surface and must be kept full of liquid at all times.

The strength of the acid water must also be kept within reasonable limits although this is easy on account of the large volume in the tank compared to the amount circulated, changes in concentration taking place slowly. This acid water should also be kept free from grosser impurities and from $CO_2$. Any filtered soft water will do for washing.

For dissolving the organic material, cellulose, silk, etc., if the solution is to be an ammoniacal one, I prefer to saturate 30% ammonia water, free from carbonate of ammonia, etc., with hydrated cupric or nickel oxides. The solutions are filtered through fibrous nitro-cellulose, cooled to about 40° F. and saturated with the material to be dissolved in suitable mixing machines. The amount of material dissolved depends largely upon the fiber, etc., used varying somewhat with each different quality or grade of the same kind of material. Some raw cottons for instance will completely dissolve in the proportion of 1 lb. cotton to 20 lbs. of cupra, while with other varieties, 1 lb. cotton to 35 lbs. solution is the best that can be done. When using zinc chloride, I employ a saturated solution of the C. P. salt in distilled water, these solutions being even more sensitive to impurities than the ammonia ones and more difficult to handle and recover.

After solution is complete the viscous mass is allowed to stand for about 24 hours, during which time it becomes much more fluid and may be forced through a filter by means of pressure. A fine sand bed on top of a layer of nitro-cotton, which in turn is supported by a fine wire screen is quite satisfactory. When desired the solutions are now concentrated by centrifugal action. In my methods hereinbefore discussed, I am not limited to the use of acids for a supporting medium. Solutions of sodium chloride, ammonium chloride, or in fact of any salt that will not readily mix with or chemically affect the cellulose solutions may be employed. Ammonium nitrate gives splendid results and may be preferred, as its ultimate product under electrolysis is ammonia which may be used over and over again.

While I have described my improvements in great detail and with respect to preferred forms thereof, I do not desire to be limited to such details or forms, since many changes and modifications may be made and the invention embodied in widely different forms without departing from the spirit and scope thereof in its broader aspects; hence I desire to cover all modifications and forms coming within the language or scope of any one or more of the appended claims.

What I claim as new and desire to cover by Letters Patent, is:

1. The method of separating silk and cotton elements from silk and cotton mixtures, which consists in treating the mixture with a solvent of one of said elements to dissolve the same, said solvent not being a solvent of the other of said elements, separating the dissolved element from the undissolved element, and removing the solvent constituents from the dissolved element by electrolysis.

2. The method of separating silk and cotton from silk and cotton mixtures, which consists in treating the mixture with nickel ammonia solution to dissolve the silk leaving the cotton undissolved, separating the dissolved silk from the undissolved cotton, and removing solvent constituents from the dissolved silk electrolytically.

3. The method of separating silk and cotton elements from silk and cotton mixtures, which consists in treating the mixture with a solvent of one of said elements to dissolve the same, said solvent not being a solvent of the other of said elements, separating the dissolved element from the undissolved element, and recovering the dissolved element from its solution.

4. The method of separating silk and cotton from silk and cotton mixtures, which consists in treating the mixture with nickel ammonia solution to dissolve the silk leaving the cotton undissolved, and separating the dissolved silk from undissolved cotton.

5. The method of separating silk and cotton elements from silk and cotton mixtures, which consists in treating the mixture with a solvent of one of said elements to dissolve the same, said solvent not being a solvent of the other of said elements, separating the dissolved element from the undissolved element, and removing the solvent constituents from the dissolved element by electrolysis, dissolving the other element and removing solvent constituents therefrom by electrolysis.

6. The method of separating silk and cotton from silk and cotton mixtures, which consists in treating the mixture with a solvent of silk to dissolve the same leaving the cotton undissolved, separating the dissolved silk from the undissolved cotton and recovering the dissolved silk from its solution.

7. The method of separating silk and cotton from silk and cotton mixtures, which consists in treating the mixture with a solvent of silk to dissolve the same leaving the cotton undissolved, separating the dissolved silk from the undissolved cotton and recovering the dissolved silk from its solution by electrolysis.

8. The method of separating silk and cotton from silk and cotton mixtures, which consists in treating the mixture with a solvent of silk to dissolve the same leaving the cotton undissolved, separating the dissolved silk from the undissolved cotton and recovering the dissolved silk from its solution by electrolysis and dissolving the cotton and removing the solvent constituents therefrom by electrolysis.

9. The method of separating silk and cotton from silk and cotton mixtures, which consists in treating the mixture with a nickel ammonia solvent of silk to dissolve the same leaving the cotton undissolved, separating the dissolved silk from the undissolved cotton and recovering the dissolved silk from its solution by electrolysis.

10. The method of separating dissimilar organic elements from mixtures thereof which consists in treating the mixture with a solvent of one of the elements to dissolve the same leaving the other element undissolved, separating the dissolved element from the undissolved element, and removing solvent constituents from the dissolved element by electrolysis.

11. The method of separating dissimilar organic elements from mixtures thereof which consists in treating the mixture with a solvent of one of the elements to dissolve the same leaving the other element undissolved, separating the dissolved element from the undissolved element, and removing solvent constituents from the dissolved element by electrolysis and dissolving the other element and removing solvent constituents therefrom by electrolysis.

12. The method of treating silk material which consists in dissolving it in nickel ammonia solution and subjecting the solution to electrolysis to separate solvent constituent from the silk.

13. The method of treating silk material which consists in treating the material with a chemical reagent to dissolve the silk and removing solvent constituents by electrolysis.

14. The method of treating silk material which consists in dissolving the silk with nickel ammonia and passing an electric current through the silk solution to remove solvent constituents therefrom.

In testimony whereof I have signed my name to this specification.

EDWIN TAYLOR.